(12) United States Patent
Dominique et al.

(10) Patent No.: US 7,532,685 B2
(45) Date of Patent: May 12, 2009

(54) METHODS OF CONTROLLING TRACKER BANDWIDTH IN WIRELESS COMMUNICATION SYSTEMS

(75) Inventors: Francis Dominique, Rockaway, NJ (US); Yi Hsuan, Whippany, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 602 days.

(21) Appl. No.: 11/094,439

(22) Filed: Mar. 31, 2005

(65) Prior Publication Data

US 2006/0222130 A1 Oct. 5, 2006

(51) Int. Cl.
*H03K 9/00* (2006.01)
(52) U.S. Cl. .................. 375/316; 375/150; 375/355; 375/227; 375/259; 370/335; 370/342; 370/319; 370/320; 370/321
(58) Field of Classification Search .............. 375/316, 375/150, 355, 227, 259; 370/335, 342, 319, 370/320, 321; 455/296, 500, 530
See application file for complete search history.

(56) References Cited

U.S. PATENT DOCUMENTS

2003/0202488 A1* 10/2003 Hsuan .................. 370/331

* cited by examiner

*Primary Examiner*—David C Payne
*Assistant Examiner*—Zewdu Kassa

(57) ABSTRACT

A method of tracking on-time errors may include producing first and second metrics from accumulated signal samples of a received data frame, and calculating a sum of, and a difference between, the first and second metrics. The calculated difference and sum values may be used to determine an estimated on-time error for the received data frame and a corrected timing error control value to be applied to the on-time error. The accuracy of the estimated on-time error may be evaluated based a signal quality metric to determine whether the corrected timing error control value is to be applied to the estimated on-time error or whether the timing adjustment for the on-time error is to be stopped.

22 Claims, 3 Drawing Sheets

METHODS OF CONTROLLING TRACKER BANDWIDTH IN WIRELESS COMMUNICATION SYSTEMS

BACKGROUND OF THE INVENTION

1. Field of the Invention

The present invention generally relates to methods for controlling tracker bandwidth and tracking on-time errors for improving tracker performance in wireless communication systems.

2. Description of Related Art

In spread spectrum wireless communication systems such as a Universal Mobile Telecommunication System (UMTS), base stations are not closely synchronized. Although mobile stations attempt to lock the base station carrier frequency, the operation is imperfect such that a frequency offset is present between a mobile station and a corresponding base station. The frequency offset becomes more obvious when the mobile station is in a handoff mode (a handoff mode is where a mobile station talks to two unsynchronized base stations) or the mobile station moves at a higher speed, which causes higher Doppler frequency. Without performing some type of timing error correction, an on-time error in a base station receiver can increase with time due to this aforementioned frequency offset. An on-time error, also known as a path offset error, is a timing error that represents a time difference between a detected transmission path, or a finger, and the actual transmission path.

To combat and correct these errors, base station receivers employ what is called a tracker. A tracker is commonly used in spread-spectrum wireless communication systems like UMTS and CDMA to correct path offset errors and track drifting paths. In such systems, path offsets detected by a multi-path searcher of the tracker usually has a lower resolution, for example ½ chip time, which corresponds to +/−¼ timing error from the ideal timing. This error results in nearly 1 dB loss of signal power. A tracker is therefore used to correct initial path offset errors.

In the case where a frequency offset or a Doppler frequency exists between a mobile station transmitter and base station RAKE receiver, a finger or path (e.g., detected propagation path from mobile station transmitter to base station receiver) seen by the base station receiver moves at a certain rate, known as a slew rate. The slew rate can be defined as a finger timing change rate in a chip per radio frame. The slew rate due to the frequency offset is such that an ideal path offset (i.e., ideal finger timing or ideal on-time) drifts over time. Thus, in addition to reducing initial path offset errors from the searcher outputs, a tracker should be able to track the timing drift and maintain on-time error as small as possible.

SUMMARY OF THE INVENTION

An example embodiment of the present invention is directed to a method of tracking on-time errors in a wireless communication system. In the method, first and second metrics may be produced from accumulated signal samples of a received data frame, and a sum of, and a difference between, the first and second metrics may be calculated. The calculated difference and sum values may be used to determine an estimated on-time error for the received data frame and a corrected timing error control value to be applied to the on-time error. The accuracy of the estimated on-time error may be evaluated based a signal quality metric to determine whether the corrected timing error control value is to be applied to the estimated on-time error or whether the timing adjustment for the on-time error is to be stopped.

Another example embodiment of the present invention is directed to an apparatus for tracking on-time errors of data frames in a wireless communication system. The apparatus may include a buffer for accumulating signal samples of a data frame that are received in the system, and a detector for retrieving first and second signal samples at different timings from the accumulated signal samples, for generating a first metric representing the first signal sample and a second metric representing the second signal sample, and for calculating a sum of the first and second metrics and a difference between the first and second metrics. The calculated difference and sum values may be used to determine an estimated on-time error for the received data frame and a corrected timing error control value to be applied to the on-time error. The apparatus may include a first comparator for evaluating the accuracy of the estimated on-time error based a signal quality metric to determine whether the corrected timing error control value is to be applied to the estimated on-time error or whether the timing adjustment for the on-time error is to be stopped.

BRIEF DESCRIPTION OF THE DRAWINGS

The example embodiments of the present invention will become more fully understood from the detailed description given herein below and the accompanying drawings, wherein like elements are represented by like reference numerals, which are given by way of illustration only and thus are not limitative of the example embodiments of the present invention.

DETAILED DESCRIPTION OF THE EXAMPLE EMBODIMENTS

The present invention is applicable to, but not limited to, UMTS base station RAKE receivers. For example, the present invention may be adapted to IS-95 standard systems. The method and apparatus have substantially low complexity without compromising system performance. The method and system may be robust for data frames having different signal-to-noise ratios, and for metrics calculated from multiple and differing slot formats. Additionally, the method and apparatus employs an adaptive or dynamic threshold technique to accommodate different transmission scenarios.

The tracker of the present invention includes two major parts. The first part is a timing error detector (TED), which accepts inputs of early and late symbols and calculates early and late metrics. Outputs of the TED include the difference and sum of the early and late metrics.

The second part of the tracker performs threshold comparison and timing correction, where TED outputs are compared with thresholds and sub-chip timing corrections to on-time errors are adjusted according to the comparison results. In addition, control and timing of the tracker are particularly important because of the wide varieties of operating modes in UMTS.

Figure 1:
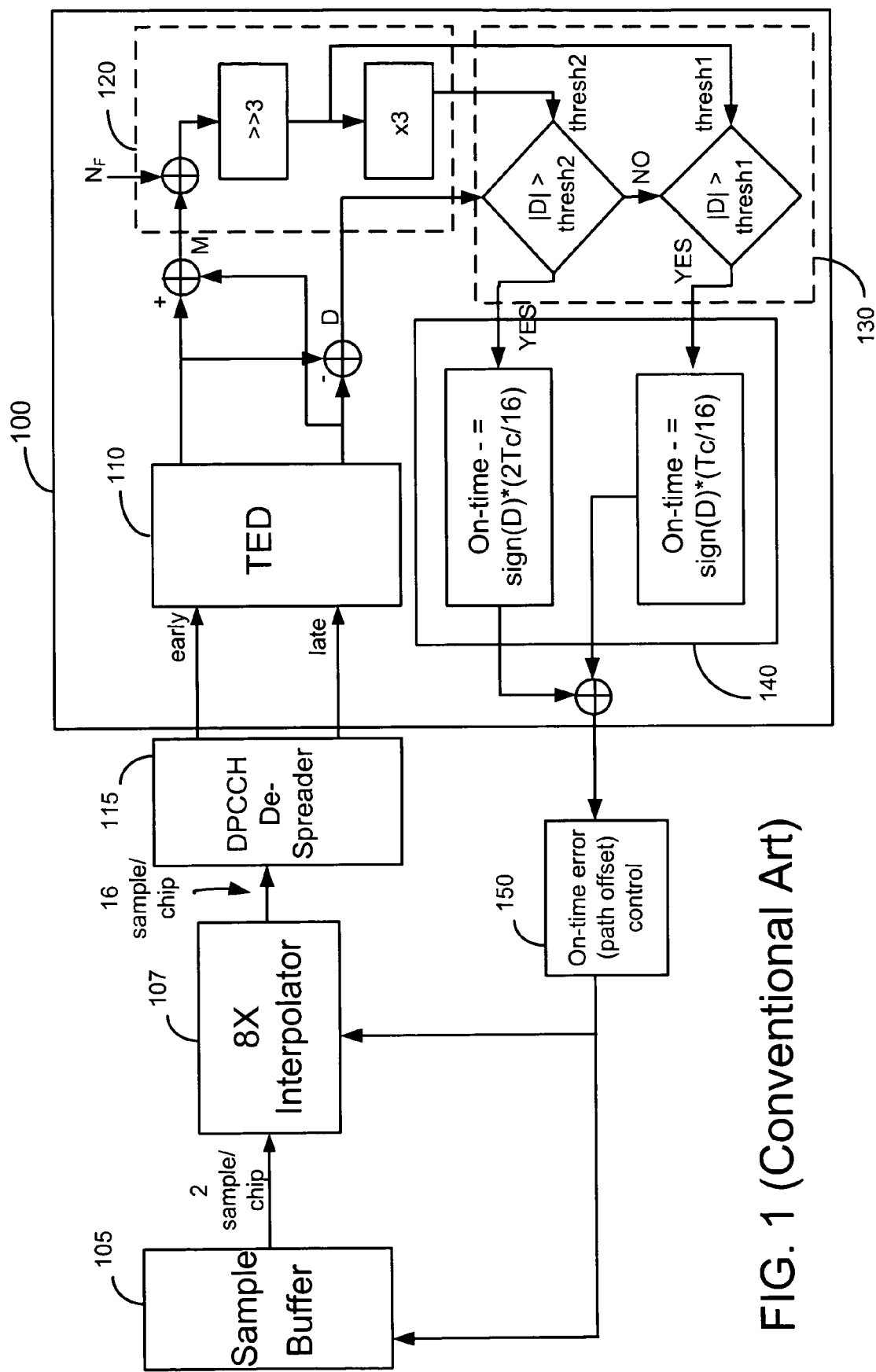
FIG. 1 illustrates a block diagram of a tracker used in a UMTS base station receiver.

FIG. 1 illustrates a block diagram of a tracker used in a UMTS base station receiver to track and correct on-time. FIG.

1 illustrates tracker 100, which in an embodiment is included for each RAKE receiver finger in a base station, and is used to describe a baseline tracker algorithm developed by the inventor, for purposes of context for the example tracker and methodology to be further explained below. Such a tracker and tracker algorithm is described in detail in co-pending and commonly assigned U.S. patent application Ser. No.10/132, 454 to Yi Hsuan, filed Apr. 26, 2002 and entitled "METHOD AND SYSTEM FOR TRACKING AND CORRECTING TIMING ERRORS IN COMMUNICATION SYSTEMS", the entire contents of which are hereby incorporated by reference herein.

Referring to FIG. 1, an interpolator 107 receives samples at a rate of 2 samples per chip for each frame of data from a sample buffer 105 and, via a filtering action performed in interpolator 107, increases the resolution to output samples of a frame at a rate of 16 samples/chip to a DPCCH despreader 115. Tracker 100 receives early and late symbols from the DPCCH despreader 115 at a timing error detector (TED) 110. The TED 110 calculates what are referred to as early metrics (first metrics) and late metrics (second metrics). Tracker 100 also includes a circular buffer and accumulators (or registers, not shown) which are filled with the slot variables as inputs (i.e., the signal samples and early and late symbols. The accumulators (not shown) are part of TED 110 and circular buffer may also be included in TED 110, or operatively connected thereto.

The TED 110 generates early and late metrics. Early and late metrics are first calculated over a slot, and then accumulated non-coherently with other slots. Early symbols are defined as complex numbers that represent corresponding signal samples of a data frame received in the detector. Early symbols are input into the TED at a symbol rate. These symbols are generated from despread DPCCH samples at DPCCH despreader 115 that are a half-chip time earlier than the "on-time" samples, which are samples obtained using the current path delay value of a finger at the receiver.

Likewise, late symbols are created from samples a half-chip later than the on-time samples. Early and late symbols are accumulated separately by coherent or non-coherent accumulation. If a series of continuous symbols in a slot are known a priori, these symbols are demodulated and then coherently accumulated. After that, results of coherent accumulation and symbols not qualified for coherent accumulation are non-coherently accumulated over a slot period.

The accumulation process is better explained in the following example. Assuming that a slot format 2 of a UMTS DPCCH channel is under consideration and Se(1), Se(2) . . . , Se(10) represent early DPCCH symbols in a slot, the metric of this slot is calculated as follows:

$$\left\| \sum_{i=1}^{5} Se(i) \right\|^2 + \left\| \sum_{i=6}^{7} Se(i) \right\|^2 + \|Se(8)\|^2 + \|Se(9)\|^2 + \|Se(10)\|^2. \quad (1)$$

The first five symbols are accumulated coherently because these are pilot channel symbols and have been already demodulated to be in phase with each other. The next two symbols 6 and 7, called Transmit Power Control (TPC) symbols, are not known a priori, but they are always the same by UMTS standard. Therefore, symbols 6 and 7 can be coherently accumulated without demodulation. Because symbols 8 and 9, called Transport Format Combination Indicator (TCFI) symbols and symbol 10 (a Feed Back Information (FBI) symbol) cannot be accumulated coherently with other symbols, the final slot metric is a non-coherent accumulation of Pilot, TPC, TFCI1, TFCI2 and FBI. A metric L2 norm, shown as absolute-squared in equation (1), converts the coherent accumulation results to be ready for non-coherent metric accumulation in the TED 110. Metrics of different slots are also non-coherently accumulated by a direct sum.

There is an exception regarding the coherent accumulation of pilot channel symbols. The purpose of doing coherent accumulation is to reduce noise power and thus increase signal-to-noise ratio. However in the presence of non-zero Doppler frequencies and frequency offsets, demodulated symbols have intrinsic phase offsets. Thus, signal-to-noise ratio gains obtained from coherent accumulation are compromised. If the sum of Doppler frequency and frequency offset is large, the length of coherent accumulation interval should be shortened to avoid further Signal to Interference Ratio (SIR) loss. The tracker 100 takes an input indicator (i.e. a FadeRate indicator), which is 1 if either the Doppler frequency or the frequency offset is high and 0 otherwise. If FadeRate is 1, the coherent accumulation interval for pilots should be no more than 4 symbols. In other words, if a slot has more than four (4) pilot channel symbols, the TED 110 only coherently accumulates 4 pilot symbols and then non-coherently accumulates the rest of the pilot channel symbols. For the above example, the slot metric is computed by expression (2):

$$\left\| \sum_{i=1}^{4} Se(i) \right\|^2 + \|Se(5)\|^2 + \left\| \sum_{i=6}^{7} Se(i) \right\|^2 + \|Se(8)\|^2 + \|Se(9)\|^2 + \|Se(10)\|^2. \quad (2)$$

When the tracker 100 completes accumulating metrics from the first 14 slots of a frame, TED 110 outputs the sum (M) and difference (D) of the accumulated early and late metrics, and then all accumulators in TED 110 are reset to zero for the next round of accumulation.

The magnitude of D is roughly proportional to the magnitude of the timing error in a certain range. The sign of D decides the sign of the timing error. Two threshold values are computed as follows to determine how much timing adjustment should be made given D.

Accordingly, when it is time for the tracker to perform a timing adjustment (usually this is at the end of a frame) the TED 110 outputs a sum (M) and a difference (D) of the accumulated early and late metrics, and all accumulators in the TED 110 are then reset to zero for the next round of accumulation (for a next frame, for example).

Based on M, two thresholds are dynamically calculated, i.e., calculated in real time. The sum M is used to calculate the real-time thresholds (thresh1, thresh2) at a calculator 120. The difference D is compared to thresh2 at comparator 130 which receives the calculated thresh2 as an input. Comparator 130 also receives the calculated thresh1 as an input, to be compared with D should the on-time error be small ($|D| \leq$ thresh2). Based on the results of the comparison(s), sub-chip timing correction to on-time errors is performed in adjuster 140 according to the comparison results, and a corrected timing error control value is output to path offset control 150 to correct the path offset error and to track drifting paths of the received frame.

Thus, since timing control is important for the receiver in the base station, the outputs of adjuster 140, which include any corrections to the on-time error, are fed back, via path offset control 150, to the sample buffer 105 and interpolator 107 for subsequently received frames. Additionally as described above, thresh1 and thresh2 are dynamically (i.e., in real-time) updated for each subsequently received data frame.

As opposed to selecting thresholds that have been calculated in advance for different conditions, and then stored in a lookup table (LUT); the present invention determines these thresholds in real time, therefore dispensing with the use or necessity of a large or complex LUT. The two threshold values may be computed using the following expression (3):

$$\text{thresh1} = (M-N_F)/8, \text{ and}$$

$$\text{thresh2} = 3*\text{Thresh1}. \quad (3)$$

In expression (3), $N_F$ is the estimated noise power within the entire duration of accumulation. $N_F$ is equal to Noise-Var.$N_S$ where $N_S$ is the number of symbols in the accumulation interval and NoiseVar is the noise variance per symbol.

Subtracting $N_F$ from M is to reduce the bias of M due to the noise factor. With these two thresholds, the tracker 100 would: (1) increase timing offset by 1/16 chip if D is positive and the magnitude of D is larger than threshold 1 but smaller than threshold 2; or (2) increase timing offset by 2/16 chip if D is positive and the magnitude of D is larger than threshold 2; or (3) decrease timing offset by 1/16 chip if D is negative and the magnitude of D is larger than threshold 1 but smaller than threshold 2; or (d) decrease timing offset by 2/16 chip if D is negative and the magnitude of D is larger than threshold 2. On-time timing offset adjustment of either 1/16 or 2/16 chip period is realized by setting the sample buffer 105 and the interpolator 110 appropriately.

Figure 2:
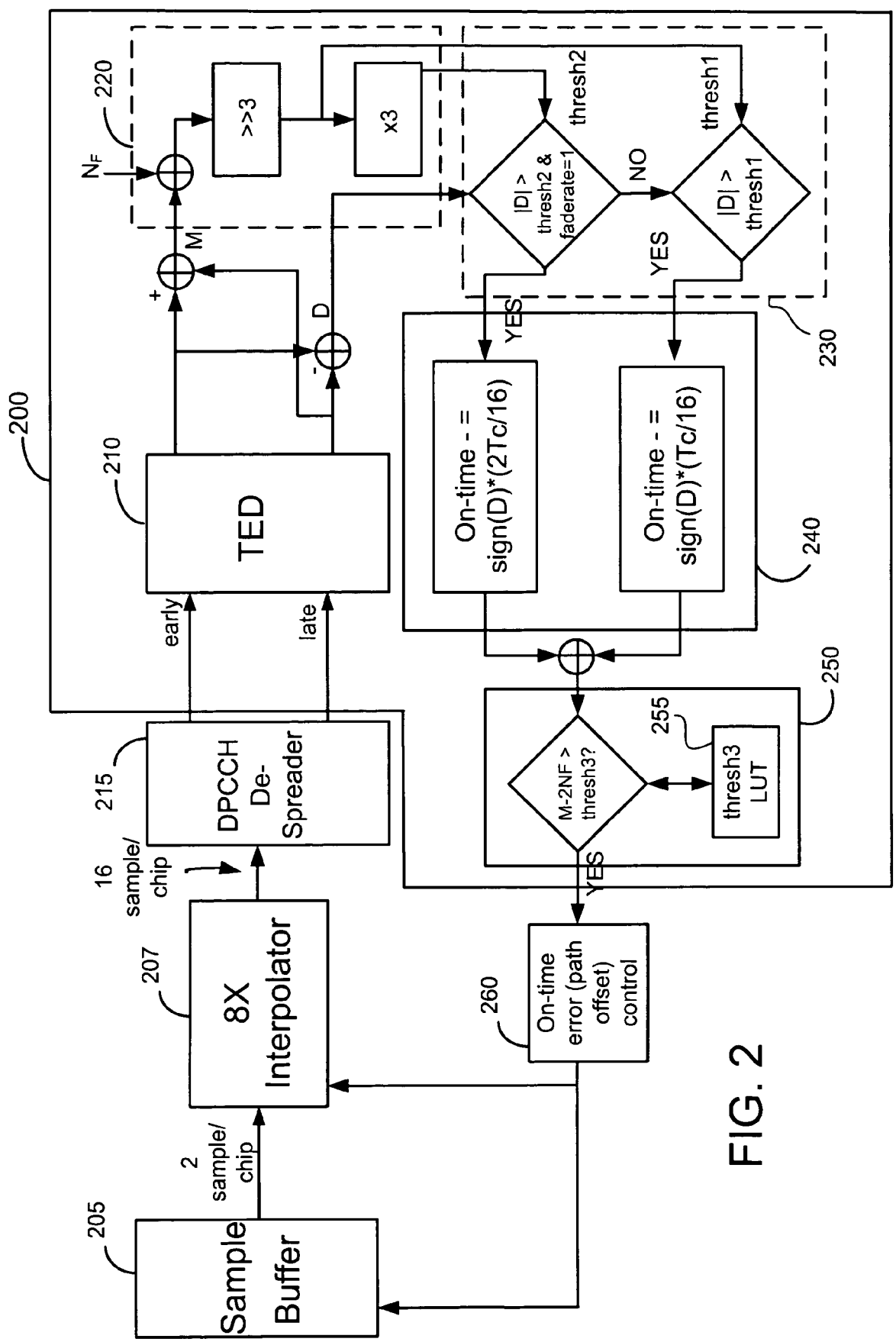
FIG. 2 is a block diagram of an apparatus used to track and correct on-time errors in accordance with an example embodiment of the present invention.

FIG. 2 is a block diagram of an apparatus used to track and correct on-time errors in accordance with an example embodiment of the present invention. Elements in FIG. 2 are similar to FIG. 1; thus that which is different is explained in detail hereafter.

Taking the path offset of the original signal as the input to a system (tracker) and the path offset after the tracker modification to be described hereafter as the output from the system, the tracker 200 in FIG. 2 can be viewed as a low-pass filter. With this in mind, the wider the filter bandwidth, the faster the filter responds to the input incitement.

As an example, third generation cellular systems should be able to support vehicles moving at high speeds. Therefore the tracker bandwidth has to be wide enough so that fast moving paths can be tracked properly. However a wider filter bandwidth also increases the instability of the system. From the point of view of the tracker function, an instable system can make the following undesirable events more likely to occur: (a) the tracker 200 keeps changing the timing offset around the correct path offset, instead of staying at the correct path offset, and/or (b) the tracker 200 moves the timing offset far away from the correct timing offset so that it cannot converge to the correct path offset any more.

Improvement can be made if the filter bandwidth is properly reduced. There may be two situations when reducing bandwidth can be beneficial. A first scenario may be where the timing error is expected to be small. A second scenario may be where the input signals are weak so most of the input energy is noise energy. Based on these two observations, the bandwidth of the baseline tracker design can be limited in two ways to improve the tracker and overall system performance.

Single Threshold At Low Fade Rate

The first way is to remove the operation related to thresh2 if the fade rate is low. As mentioned above, the fade rate indicator is 0 if both the frequency offset and Doppler frequency are determined to be small. In this case, the timing offset of a propagation path is not going to drift at a high rate. Note that the purpose of using thresh2 is to make the tracker 200 able to adjust timing offset at 2/16 chip each time, which allows the tracker 200 to track a fast moving path. However, in adjusting 2/16 chip each time, the system may become less stable because the bandwidth has been widened. But, if it is known that a path is not drifting fast, the second threshold (thresh2) may be removed in order to improve the system stability.

No Timing Adjustment For Noisy Paths

If a path moves into deep fading, the signal becomes substantially small and the timing error estimation is unreliable. If the tracker 200 continues the normal operation, it is likely to introduce more timing errors instead of reducing path offset errors. In this scenario, it may be desirable therefore to stop any timing adjustment, i.e., by reducing the filter (i.e., tracker 200) bandwidth to 0.

The output of comparator 230 is an estimation of the timing error, which may or may not be the true timing error. Adjuster 240 outputs the corrected timing error control value to path offset control 260 to correct the path offset error and to track drifting paths of the received frame.

To determine if a path is too noisy, the existing metric M, which is the sum of the early and late metrics at the output of TED 210 in FIG. 2, is considered here. The metric $M-2N_F$ removes the noise energy from M and results in a metric that linearly increases with the signal-to-noise ratio. The metric $M-2N_F$ is thus a measure for the path signal strength. Therefore this metric, which may be referred to as a 'signal quality metric', can be compared in comparator 250 (connected to the output of adjuster 240) with a third threshold (thresh3) to determine whether a path is too weak and whether the tracker bandwidth should be reduced to zero. In other words, the purpose of comparing $M-2N_F$ to thresh3 is to determine if the estimation of timing error is accurate our not, such that either the corrected timing error control value is output from adjuster 240 to path offset control 260, or tracker bandwidth is reduced to 0 (i.e., the estimation is not accurate) and no timing adjustment is sent to path offset control 260. Note that because different metrics are accumulated differently for different slot formats as described previously, thresh3 may be calculated in advance for different slot formats and stored in a suitable lookup table 255.

Accordingly, the modified tracker 200 with the above improvements is illustrated in FIG. 2, and includes the comparator 250 for comparing the known signal quality metric $(M-2N_F)$ against a given thresh3 to determine whether a path is too weak and whether the tracker bandwidth should be reduced to zero, or whether the corrections to the path offset errors generated in adjuster 240 are to be applied to the on-time error at path offset control 260.

Figure 3:
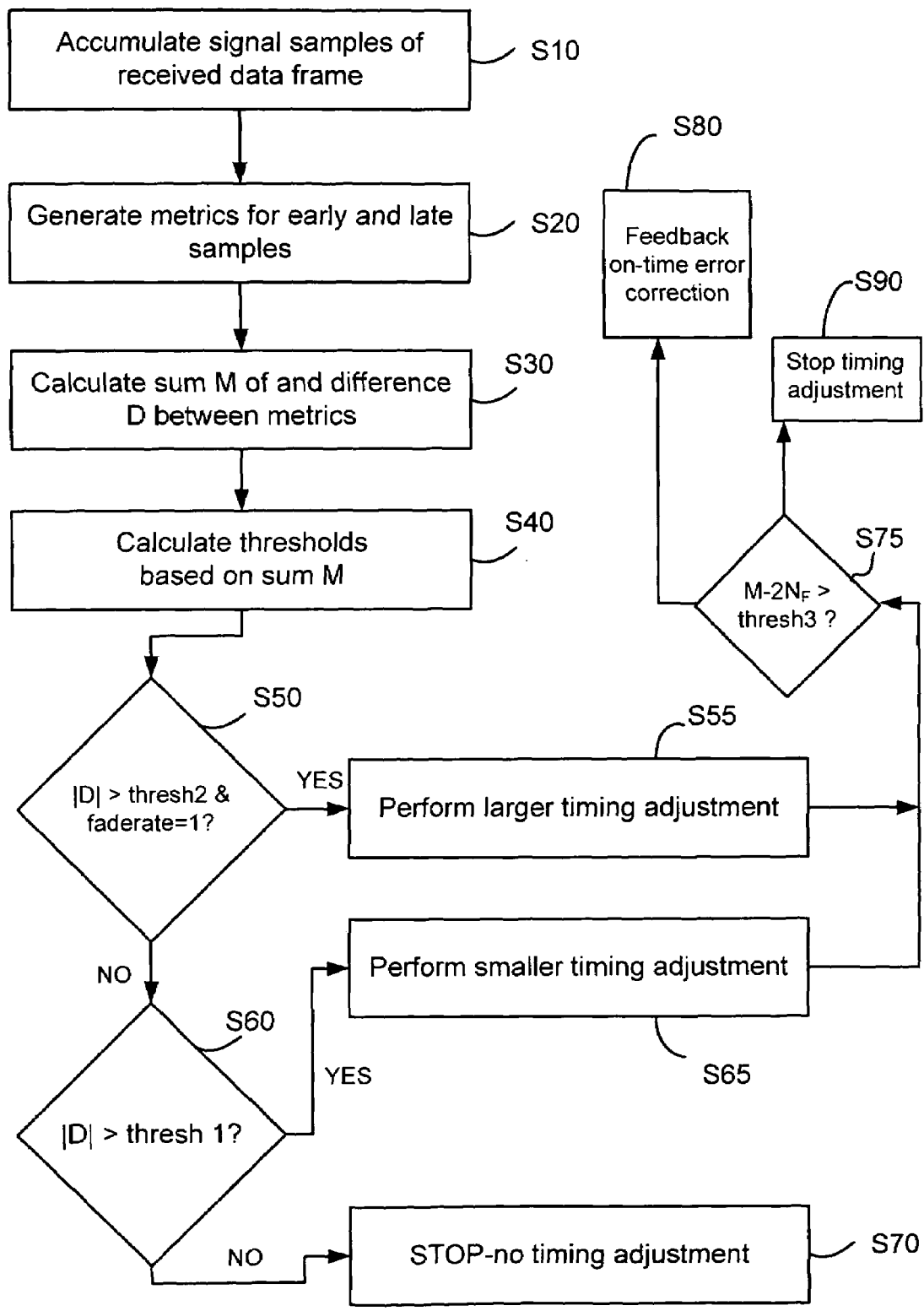
FIG. 3 is a flow diagram illustrating the method of controlling tracker bandwidth to correct on-time errors in accordance with an example embodiment of the present invention.

FIG. 3 is a flow diagram illustrating the method of controlling tracker bandwidth to correct on-time errors in accordance with an example embodiment of the present invention.

In accordance with FIG. 3, a data frame is received in sample buffer 205 of a base station RAKE receiver, where a plurality of signal samples that comprise the data frame are accumulated (S10). TED 210 in tracker 200 of the receiver retrieves certain signal samples from these accumulated samples (i.e., a first or early symbol and a second or late symbol). As previously described, the early and late symbols are generated from despread dedicated physical control channel (DPCCH) samples in despreader 115. As discussed above, the early symbol is created from samples that are a half chip-time earlier than on-time samples, and the late symbol is created from samples that are a half chip-time later than the on-time samples.

These early and late symbols are accumulated so that the TED 210 can generate metrics (S20). TED 210 generates a first metric representing the early symbols, and hence its corresponding signal samples, and a second metric representing the late symbols and hence its corresponding signal samples.

Based on the generated metrics, the sum (M) of the two metrics and the difference (D) between the two metrics are calculated (S30) and output from TED 210. Based on the sum M, a calculator 230 in the tracker 200 calculates thresholds (thresh1, thresh2) (S40) that are used for comparison to the difference D, which is representative of the on-time error (i.e., path offset errors) between the two metrics.

In an embodiment, the first threshold (thresh 1) may be calculated in calculator 220 for evaluating smaller on-time errors in comparator 230, and the second threshold (thresh 2) may be calculated for evaluating larger on-time errors. If the absolute value of D is greater than thresh 2 and the faderate indicator of the signal is equal to 1 (YES at S50), a larger timing adjustment is made in adjuster 240 to the on-time error (S55). If the absolute value of D is less than thresh2 (NO at S50), then the absolute value of D is compared to thresh1 at S60. If the absolute value of D is greater than thresh1 (YES at S60), then a smaller, refined timing adjustment, as previously described above, is made in adjuster 240 (S65).

In both cases, a timing error control value that represents an on-time error correction may be fed back, via path offset control 260, to the buffer 205 and/or interpolator 207 for a subsequently received data frame (S80). Where the absolute value of D is less than thresh1 (NO at Step S60), no timing adjustment is made (S70) for that data frame.

However, before the timing error control value is fed back at S80, another determination is made to determine whether the path is too weak and hence the tracker bandwidth should be reduced to zero. As described above, a signal quality metric (M–N$_F$), which is the difference between the sum of the first and second metrics (M) and the estimated noise power within the entire duration of accumulation (N$_F$) is compared (S75) to a third threshold (thresh3). If M–N$_F$ exceeds thresh3 (output of S75 is 'YES'), then the calculated timing error control value in adjuster 240 is applied to the on-time error at path offset control 260 and fed back to sample buffer 205 and interpolator 207, otherwise, the path is too weak and tracker bandwidth is reduced to zero (S90). In other words, tracker 200 can cease making any path offset adjustment to the on-time error at path offset control 260.

The methodologies described here may reduce the tracker loop bandwidth adaptively when a fast path-drifting rate is not expected or the input signals are too weak. Using this methodology may improve the tracker performance at low Doppler/frequency offset scenarios, while maintaining the performance at high Doppler/frequency offset scenarios. When dealing with substantially weak paths, the modified tracker 200 can cease making a path offset adjustment, thus eliminating the possibility of introducing more timing errors into the paths in such cases.

Accordingly, two methods for controlling the path offset tracker (tracker) bandwidth described above may improve the tracker performance in certain propagation scenarios. The example methodologies and apparatus reduce the tracker bandwidth when the signals are weak or the channel variation fade is small, resulting in more robust time tracking performance and improvement of the overall system.

The example embodiments of the present invention being thus described, it will be obvious that the same may be varied in many ways. Such variations are not to be regarded as departure from the spirit and scope of the example embodiments of the invention, and all such modifications as would be obvious to one skilled in the art are intended to be included within the scope of the following claims.

What is claimed is:

1. A method of tracking on-time errors in a wireless communication system, comprising:
    producing first and second metrics from accumulated signal samples of a received data frame;
    calculating a sum of the first and second metrics and a difference between the first and second metrics;
    using the calculated difference and sum values to determine an estimated on-time error for the received data frame and a corrected timing error control value to be applied to the on-time error; and
    evaluating, using a comparator, the accuracy of the estimated on-time error based on a signal quality metric to determine whether the corrected timing error control value is to be applied to the estimated on-time error or whether the timing adjustment for the on-time error is to be stopped, the signal quality metric being determined as a function of the sum and a channel quality parameter, the evaluating including,
    comparing the signal quality metric to a threshold to determine whether the corrected timing error control value is to be applied or whether the timing adjustment for the on-time error is to be stopped.

2. The method of claim 1, wherein using includes:
    computing at least one of a first and second threshold value based on the sum;
    comparing the difference to at least one of the first and second threshold values to determine the on-time error for the received data frame, wherein the difference is only compared to the first threshold to determine the on-time error if the fade rate for the accumulated signal samples of the received data frame is substantially low; and
    adjusting timing for the on-time error based on the first comparison to generate the corrected timing error control value to be applied to the on-time error,
    wherein the threshold that is compared to the signal quality metric is a third threshold.

3. The method of claim 2, wherein the channel quality parameter is an estimated noise power value and the signal quality metric is a function of the sum (M) and the estimated noise power value (N$_F$) within an entire duration that the signal samples are accumulated, the signal quality metric represented as M–2N$_F$.

4. The method of claim 3, wherein the corrected timing error control value is applied to the on-time error if M–2N$_F$ exceeds the third threshold.

5. The method of claim 3, wherein no timing adjustment is made to the on-time error if M–2N$_F$ is less than or equal to the third threshold.

6. The method of claim 2, wherein the adjusting includes calculating an on-time error correction for subsequently received data frames.

7. The method of claim 1, wherein the first and second signal samples are retrieved at different timings.

8. The method of claim 1, further comprising:
    interpolating the received signal samples to increase a signal sample rate from 2 to 16 samples/chip, wherein the retrieving further includes retrieving an early signal sample and a late signal sample with respect to an on-time sample, and wherein the producing step produces first and second metrics from despread and accumulated dedicated physical control channel (DPCCH) samples that are a half-chip time earlier and a half-chip time later than on-time samples.

9. The method of claim 2, wherein the computing step calculates the first and second threshold values in real time for smaller and larger on-time errors contained in each received data frame.

10. The method of claim 9, wherein the computing step calculates the first threshold, thresh1, as thresh1=(M−$N_F$)/8.

11. The method of claim 10, wherein the computing step calculates the second threshold, thresh2, as thresh2=3*thresh1.

12. The method of claim 11, wherein the first and second thresholds are dynamically updated for subsequently received data frames.

13. The method of claim 11, wherein only thresh1 is compared to the difference if a fade rate indicator for the accumulated signal samples of the received data frame=0, indicating a substantially low fade rate.

14. The method of claim 11, wherein the first comparing compares an absolute value of the difference, |D|, to thresh2, and the adjusting generates the corrected timing error control value to be applied to relatively larger on-time errors if |D|>thresh2 and a fade rate indicator=1, otherwise the adjusting generates the corrected timing error control value to be applied to relatively smaller on-time errors if |D|>thresh1, else no timing adjustment is performed.

15. The method of claim 14, wherein the corrected timing error control value is applied to the on-time error if M−2$N_F$ exceeds the third threshold, else no timing adjustment is made to the on-time error if M−2$N_F$ is less than or equal to the third threshold.

16. An apparatus for tracking on-time errors of data frames in a communication system, comprising:

a buffer for accumulating signal samples of a data frame that are received in the system;

a detector for retrieving first and second signal samples at different timings from the accumulated signal samples, for generating a first metric representing the first signal sample and a second metric representing the second signal sample, and for calculating a sum of the first and second metrics and a difference between the first and second metrics, wherein the calculated difference and sum values are used to determine an estimated on-time error for the received data frame and a corrected timing error control value to be applied to the on-time error; and a first comparator for evaluating the accuracy of the estimated on-time error based on a signal quality metric to determine whether the corrected timing error control value is to be applied to the estimated on-time error or whether the timing adjustment for the on-time error is to be stopped, the signal quality metric being determined as a function of the sum and a channel quality parameter, the first comparator for comparing the signal quality metric to a threshold to determine whether the corrected timing error control value is to be applied or whether the timing adjustment for the on-time error is to be stopped.

17. The apparatus of claim 16, further comprising:

a calculator for computing at least one of first and second threshold values based on the sum;

a second comparator for comparing the difference to one of the first and second threshold values to determine the estimated on-time error, wherein the difference is only compared to the first threshold to determine the on-time error if the fade rate for the accumulated signal samples of the received data frame is substantially low; and an adjuster for adjusting timing for the on-time error based on the comparison in the second comparator to generate the corrected timing error control value to be applied to the on-time error, wherein the threshold that is compared to the signal quality metric is a third threshold.

18. The apparatus of claim 17, wherein the channel quality parameter is an estimated noise power value and the signal quality metric is a function of the sum (M) and the estimated noise power value ($N_F$) within an entire duration that the signal samples are accumulated, the signal quality metric represented as M−2$N_F$.

19. The apparatus of claim 18, wherein the corrected timing error control value is applied to the on-time error if M−2$N_F$ exceeds the third threshold.

20. The apparatus of claim 18, wherein no timing adjustment is made to the on-time error if M−2$N_F$ is less than or equal to the third threshold.

21. The apparatus of claim 17, wherein the adjuster calculates the corrected timing error control value for correcting the on-time error that is effective for subsequently received data frames.

22. The apparatus of claim 17, wherein the calculator calculates the first threshold value and the second threshold value in real time for smaller and larger on-time errors contained in each received data frame, the first and second threshold values being dynamically updated for each subsequently received data frame.

* * * * *